June 20, 1933.  M. H. RIBEIRO  1,915,242
METHOD FOR TREATING NUTS
Filed Oct. 14, 1932
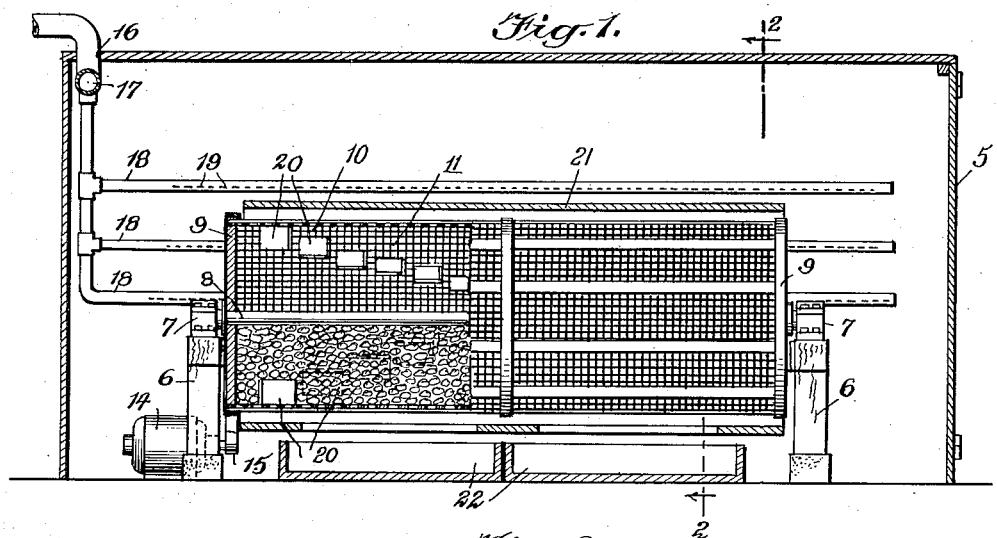
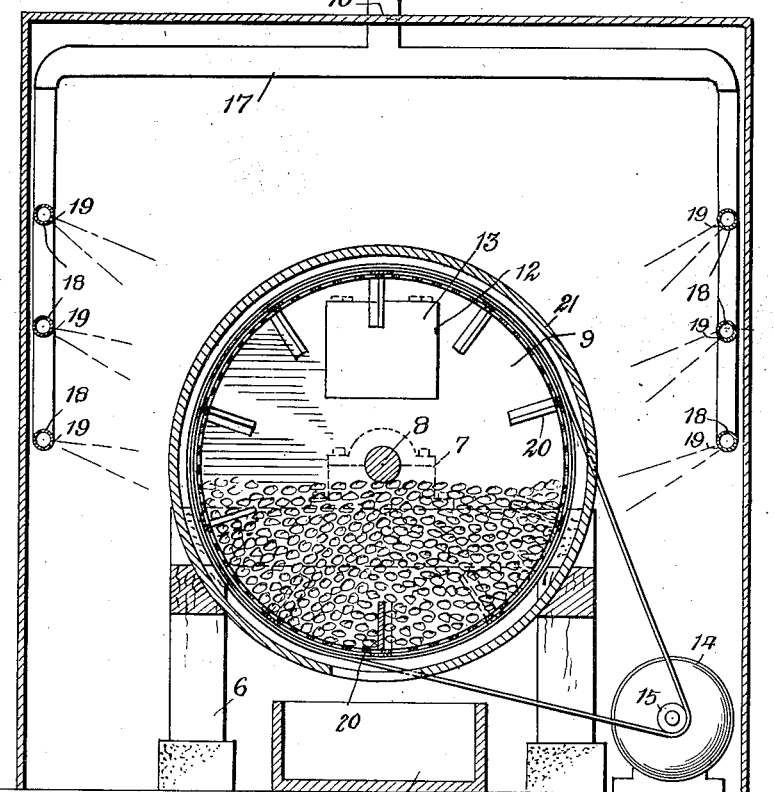
WITNESSES
INVENTOR
Manoel Homero Ribeiro
BY
ATTORNEYS Patented June 20, 1933

1,915,242

UNITED STATES PATENT OFFICE

MANOEL HOMERO RIBEIRO, OF PARA, BRAZIL, ASSIGNOR TO A. C. HERRMANN CO., OF NEW YORK, N. Y., A CO-PARTNERSHIP COMPOSED OF JOHN F. VAKIENER AND MITCHEL BECK

METHOD FOR TREATING NUTS

Application filed October 14, 1932. Serial No. 637,839½.

The invention relates to a method of treating nuts, and particularly Brazil nuts, and it has for an object to provide a method of improving the appearance of the nuts and at the same time retaining the natural color of the nuts.

Another object of the invention is to improve the quality of the nuts by removing the moisture from the shells and the kernels, which also sterilizes the nuts, thereby increasing the keeping quality of the nuts.

Still another object of the invention is to remove the outer portions of the shells of the nuts, which permits the packing of a greater number of the treated nuts in a container, and which insures a greater number of the nut kernels in each pound of nuts sold. The removal of the outer portions of the shells of the nuts also makes the nuts easier to crack.

A further object of the invention is to heat the nuts in a manner which permits the identification of the poor and spoiled nuts so that they may be removed from the perfect nuts.

Additional objects of the invention will appear in the following specification in which the preferred form of the invention is described.

In the drawing similar reference characters refer to similar parts in both views, of which Figure 1 is a side sectional elevation of the device used in treating the nuts, and Figure 2 is an enlarged sectional view on the line 2—2 of Figure 1.

In the sale of nuts, and particularly Brazil nuts, the appearance of the nuts must be considered, for, if the nuts look dirty, or if the nuts do not look attractive, the purchaser hesitates or refuses to purchase the nuts. It is also important that the storekeeper be in a position to convince the purchaser that no poor or spoiled nuts are mixed with the good nuts.

The present invention provides a method and device to give the nuts an attractive and sparkling appearance by removing the outer portions of the shells of the nuts and by polishing the outer surfaces of the remainder of the nut shells; the removal of the outer portions of the shells of the nuts also serving to make the nuts easier to crack. The nuts are also treated by dry heat, which dries the nut shells and the kernels of the nuts, thereby sterilizing the nuts, this heat also serving to release an oil in the kernels of the bad or spoiled nuts, which colors the shells of the bad or spoiled nuts so that they may be easily identified and readily removed from the good nuts.

By referring to the drawing it will be seen that an oven or chamber 5 is provided in which are mounted standards 6 having bearings 7 in which are journaled the ends of a shaft 8. Heads 9 are secured to the said shaft 8 adjacent the bearings 7 and the said heads 9 are connected by a network of steel bands, there being longitudinally extending steel bands 10 which are intertwined or laced with the annular steel bands 11, the said bands 10 and 11 forming a drum having openings approximately one-quarter of an inch in width and length between the longitudinally extending steel bands 10 and the annular steel bands 11. One of the heads 9 has an opening 12 therein which is normally closed by a door 13, the opening 12 and the door 13 being provided to permit of the introduction of the nuts into the drum formed by the steel bands 10 and 11 and the heads 9, the opening 12 also permitting of the removal of the nuts from the drum after they have been treated.

Disposed in the oven or chamber 5 there is a motor 14 which has a shaft with a pulley 15 which is connected with the periphery of one of the heads 9 which serves as a pulley, so that the motor 14 may be used to rotate the heads 9, together with the drum formed by the steel bands 10 and 11. There is also an opening 16 in the oven or chamber 5 through which extends a pipe 17 having branches 18, the branches 18 having apertures 19, so that dry heated air may be introduced into the oven or chamber 5 through the said pipe 17, the branches 18 and the outlets at the apertures 19. The heat which is supplied to the oven or chamber 5 is dry and of a temperature of from forty-five to fifty-five degrees centigrade, this having been found to be the preferred temperature in the use of the device. With dry heated air supplied to the oven or chamber 5 in the manner set forth, the drum is rotated by the motor 14 preferably from twenty-five to thirty revolutions per minute, and the nuts which have been introduced into the drum are rotated in the manner set forth and are subjected to the heat, as stated, for a period depending upon the ripeness and the quality of the nuts.

In treating Brazil nuts it has been found to be best to rotate the nuts and subject them to a heat for from six to eight hours.

Disposed in the drum and secured to the steel bands 10 and 11 there is a plurality of scoops 20 which are arranged spirally in the drum, as illustrated in Figure 1 of the drawing, these scoops 20 serving to raise the nuts in the drum as the drum rotates so that the nuts will be permitted to fall continually and rub against each other and rub against the steel bands 10 and 11, which serves to wear away the outer portions of the shells of the nuts and to polish the outer surfaces of the remainder of the shells, the dirt, as well as the portions of the shells which are removed, falling through the openings between the steel bands 10 and 11 to the casing 21 and the container 22. Therefore, it will be seen that, during the rotation of the drum and with the heating of the oven or chamber 5, the outer surfaces of the shells will be cut away, it being found to be advisable to cut away approximately eighteen percent of the shells, which permits the heat to penetrate more readily through the remainder of the shells and the kernels of the nuts, thereby heating or sterilizing the remainder of the shells and the kernels of the nuts which prevents the sound nuts from becoming moldy when they are packed, shipped and stored. During this treatment a considerable portion of the moisture in the kernels of the nuts is removed.

Furthermore, with the removal of the outer portions of the shells of the nuts, and with the heating of the remainder of the shells and the kernels of the nuts, the heating process releases an oil in the kernels of the bad or spoiled nuts which colors the outer portions of the shells thereof, so that the bad or spoiled nuts may be readily identified and may be separated from the good or sound nuts. When Brazil nuts are treated in the manner set forth, the heat serves to color the shells of the bad or spoiled nuts a very dark color and, in some cases, makes the nut shells black. Therefore, it will be understood that not only will the outer portions of the shells of the good or sound nuts be cut away and the good or sound nuts dried and sterilized, but the bad or spoiled nuts will be colored so that they may be identified, separated and removed from the good or sound nuts.

The casing 21 is disposed around the drum formed by the steel bands 10 and 11 and the casing is open at its bottom to permit the dust and other matter to fall into the containers 22.

There are two sets of scoops 20, as shown in the drawing, one set of scoops being arranged spirally to move the nuts in one direction and the other set of scoops being arranged spirally to move the nuts in the opposite direction.

While in the drawing there is shown one means for rotating the drum formed by the steel bands 10 and 11, it will be understood that other means may be employed for rotating this drum.

What is claimed is:

1. The herein described method of treating Brazil nuts which consists in agitating the Brazil nuts in a tumbler for a sufficient length of time to remove the moisture, reduce the thickness of the shell, and polish said shell, and at the same time exposing the nuts to dry, heated air, at such a temperature and period of time to cause discoloration of bad nuts.

2. The herein described method of treating Brazil nuts to remove moisture content of shell and kernel, to sterilize the kernel, which consists in agitating the Brazil nuts in a tumbler to cause discoloration of bad nuts, and to remove part of the shell and polish the same and at the same time exposing the nuts to dry, heated air, the temperature being from approximately 45° to 50° centigrade, and the time of treatment in accordance with the ripeness and quality of the nuts.

MANOEL HOMERO RIBEIRO.